June 19, 1951  R. T. ZWACK  2,557,333
FLUID CONTROL MEANS
Filed July 18, 1946
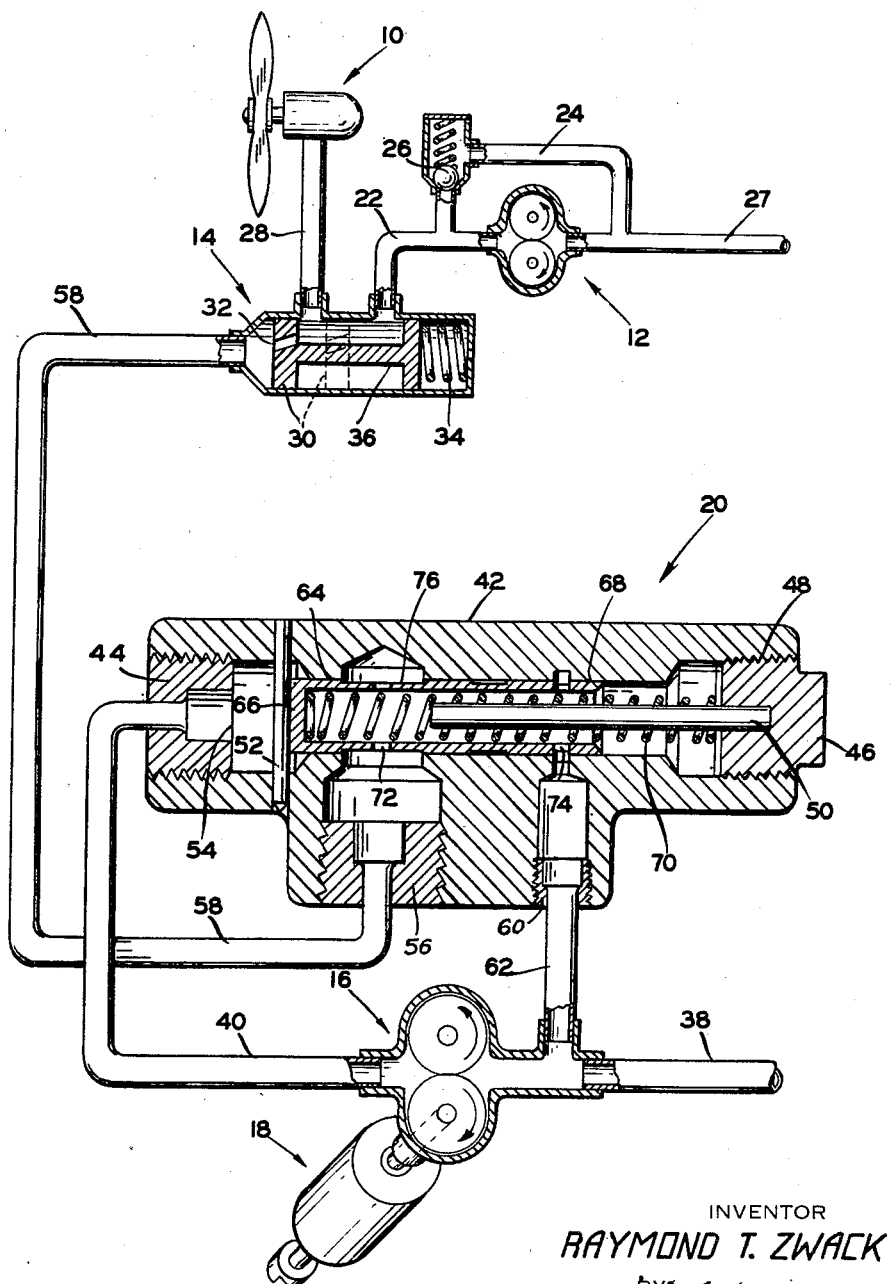
INVENTOR
RAYMOND T. ZWACK
BY
ATTORNEY Patented June 19, 1951

2,557,333

UNITED STATES PATENT OFFICE 2,557,333

FLUID CONTROL MEANS

Raymond T. Zwack, West Caldwell, N. J., assignor to Bendix Aviation Corporation, Teterboro, N. J., a corporation of Delaware Application July 18, 1946, Serial No. 684,461

8 Claims. (Cl. 170—160.23)

This invention relates to fluid control means, and particularly to such means adapted to maintain fluid at a predetermined flow condition irrespective of effects, such as temperature differences, between remotely related fluid pressure and responsive means, as in the pitch operation and control of aircraft propeller blades and the like.

In the selected example of apparatus to which the invention applies, the blade pitch of an aircraft propeller is automatically adjusted in accordance with the craft speed, by means including a governor pump and a transfer valve adjacent to the propeller, which translates this adjustment back to the engine to maintain the speed of the latter substantially constant irrespective of variations in the speed of the craft.

Normally, within certain limits of propeller pitch change, the means adjacent to the propeller is sufficient of itself to effect such change, but where feathering is desired, the pitch changing means is insufficient, by reason of low pressure and flow delivery of its governor pump, either to feather the blades, or to unfeather them after they have been feathered, in sufficiently short periods of time for effective operation.

It has heretofore been suggested to provide a high pressure feathering pump in a conduit circuit from the engine crank case, through the high pressure pump and the transfer valve to the propeller pitch changing servo means, and to provide a bleeder hole in the transfer valve in the conduit circuit between the valve and the feathering pump.

Also, since space and weight are critical in aircraft practice, and, since each engine is provided with a starter motor, it has heretofore been suggested to make the starter motor reversible, so that, when it operates in one direction, it slips relative to the aforementioned feathering pump and starts the engine, and when it operates in the opposite direction, it operates the feathering pump.

Thus, in the latter mentioned operation when feathering is not being effected, and the feathering pump should be inactive, the oil from the governor pump and the transfer valve bleeder hole passes back through the feathering pump outlet and has a reverse operating effect on the feathering pump and the starter gearing, which causes the starter clutch jaw to engage the rotating engine jaw, with resultant damage to these jaws.

The latter construction has the further objection that, since the high pressure feathering or starter pump is remotely disposed from the pitch control means, the oil in the line is subject to temperature effects, such that low temperatures thicken the oil and render it less fluid, whereby sufficiently rapid control of feathering and unfeathering cannot be effected.

Among the objects of the present invention are to overcome all of the above-mentioned objectionable features, and to do so by novel effective means.

Another object is to prevent reverse operation of a pump and to eliminate adverse effects of such operation, as in the example given above.

Another object is to prevent adverse influences on the effectiveness of fluid in a system as indicated, resulting from inactivity, distance of travel, temperature changes and other causes, and to maintain the fluid in condition for substantially instantaneously effective use at all times.

Another object is to provide novel valve means and to locate it such as to control the fluid in a novel manner for obtaining the above-mentioned advantages.

Another object is to ensure maximum feathering pump efficiency by preventing leakage flow upon actuation of the above-mentioned novel valve means of the invention.

Another object is to provide a novel valve structure that is simple and durable in construction, economical to manufacture, and effective in its operation.

These and other objects and features of the invention are pointed out in the following description in terms of the embodiment thereof which is shown in the accompanying drawing. It is to be understood, however, that the drawing is for the purpose of illustration only, and is not designed as a definition of the limits of the invention, reference being had to the appended claims for this purpose.

In the drawing:

The single figure is a diagram of a portion of a fluid system embodying the invention, including a valve shown in side section as actually constructed.

Since aircraft propeller pitch control systems, of the type to which the present invention relates, are usual and well known to those versed in the art, only so much of such system deemed necessary to a proper understanding of the present invention is indicated herein.

Referring to the drawing, that portion of the system illustrated, which may be any of several systems of various type, comprises, in general, fluid-responsive actuating servo means 10, a so-called governor pump 12, a governor transfer valve 14, an engine starter feathering pump 16 driven by a reversible electric motor 18, and a valve 20 of the invention.

The actuating servo means 10 is of a usual type, and is adapted to regulate and actuate the pitch of aircraft propeller blades.

The governor pump 12 is shown as of the gear type communicating, through a conduit 22, with the transfer valve 14, and, by way of example, having a by-pass conduit 24 including a relief or check valve 26 for a purpose to be later pointed out. The inlet side of the governor pump 12 is connected, as by a conduit 27, to the outlet side of the engine lubricating pump.

The transfer valve 14 communicates, through a conduit 28, with the actuating servo means 10, and includes a movable valve member 30 having a bleeder hole 32, and biased to the left, as shown, by a spring 34 through the intermediary of a plunger 36.

The feathering pump 16, as shown, is also of the gear type, and communicates from one side, through a conduit 38, with the crank case of an internal combustion engine for driving, in this instance, a propeller, the pitch of the blades of which is controlled by the means 10. The pump 16 communicates at the other side, through a conduit 40, with one end of the valve 20.

The motor 18 is of the reversible type abovementioned, which, when actuated in one direction, operates a starter jaw in cooperation with an engine shaft jaw to start the engine, during which the motor has clutch slip relation to the feathering pump 16, and when actuated in the opposite direction, operates through the clutch to actuate the feathering pump 16 through one of the gears of the latter.

The valve 20 comprises, in the example given, a housing 42 having a valve chamber or through bore 44, a plug 46 closing one end 48 of the bore and supporting a spring guide pin 50 extending into the bore 44. A stop pin 52, of small diameter compared to the diameter of the bore at the other or ported end 54 thereof, is press fitted in the housing 42 across the bore 44 adjacent to the end 54. The end 54 communicates with the conduit 40.

The housing 42 forms a first side port 56 of relatively large diameter intersecting the bore 44 next to the housing end 54, and communicating, through a conduit 58, with the transfer valve 14. The housing 42 forms a second side port 60, of smaller diameter than the port 56, intersecting the bore 44 at a position between the first side port 56 and the plug 46, and communicating, through a conduit 62 with the conduit 38.

A thimble-like valve plunger 64 slidably fits the bore 44, with its closed end 66 next to the stop pin 52, and receives the spring guide pin 50 through the open end 68 of the plunger. A compression spring 70, around the pin 50, extends from the plug 46, into the plunger 64, to the closed end 66 of the latter, and biases the plunger toward position, against the stop pin 52, closing the bore end 54.

The plunger 64 is provided with side ducts 72 and 74 communicating with each other through the plunger, and located in register with the ports 56 and 60, respectively, when the plunger is in the position shown, closing the bore end port 54. When the plunger 64 is moved to a second or open position to open the end 54 to the port 56, the duct 74 is first closed relative to its corresponding port 60. In the latter position, the plunger is sealed relative to the housing to prevent communication between the duct 72 and the conduit 62 between the housing and the plunger.

The plunger 64, in the position shown, has in this instance, a portion 76 of reduced outer diameter of a width, or extent along the plunger, substantially equal to and coextensive with the diameter of that portion of the diameter of the port 56 intersecting the bore. This feature operates, when the plunger is moved to the above-mentioned second position, to retain the duct 72 in communication with the port 56, to thereby prevent a hydraulic lock in the plunger, and to provide hydraulic balance.

In operation, with the parts in the positions indicated, the system is set up as it is during normal pitch control, also during which the motor 18 is deenergized and the feathering pump 16 is inactive.

During this condition, with the governor pump 12 operating at all times during the engine operation and rotation of the propeller, the valve member 30, of the transfer valve 14, is to the left of the conduit 28, as indicated in full lines, whereby pressure of the fluid being pumped by the governor pump 12 is transmitted through the conduit 22, the transfer valve 14 and the conduit 28 to the servo actuator means 10, with a small amount of the warm oil bleeding through the bleeder hole 32. The fluid bleeding through the hole 32 travels through the conduit 58, the side port 56 of the valve 20, the duct 72, the plunger 64, the duct 74, the side port 60 and the conduit 62, thus by-passing the feathering pump 16 into the crank case return conduit 38. Back flow of the fluid from the bleeder hole 32 is thus prevented from reversely operating the pump 16, which action, in prior systems of this kind, was transmitted through the above-mentioned clutch and the starter gearing to cause engagement between and damage to the starter and engine clutch jaws, as above pointed out.

Also, and as another major advantage of the present invention, the continued flow of the warm bleeder hole fluid, as above pointed out, by reason of proximity to the feathering pump 16 and the conduit 40, maintains the oil in the entire system shown, in such condition that, when feathering is effected, the feathering pump 16, the valve 20, and all of the other parts, are substantially instantaneously responsive to starting of the feathering pump for rapid and effective feathering, and the sluggishness and delay of operation, resistance to flow, and other disadvantages of congealed oil, are effectively eliminated. In this connection, it is obvious, that the valve 20 may be located directly on, or in, the pump 16.

When the feathering pump is started, the by-pass, represented by the duct 74, the port 60 and the conduit 62, is cut off, to maintain maximum hydraulic efficiency of the pump 16, and the warm oil is pumped thereby through the conduit 40 and the bore end 54 of the valve 20 against the closed end 66 of the valve plunger 64, which forces the latter, against the action of the spring 70, to open the end 54 relative to the side port 56, which is constructed of large diameter, as aforesaid, to provide full flow of the fluid of greater pressure from the feathering pump 16 through the side port 56, and the conduit 58, to force the valve member 30 of the transfer valve 14 against the action of the spring 34 to position, indicated by dotted lines, between the conduits 28 and 22.

With the valve member 30 in the latter position, the high pressure fluid from the feathering pump 16 overcomes the lower pressure of the fluid through the bleeder hole 32, thereby transmitting the high pressure through the conduit 28 to the actuating servo means 10, and causing the relief valve 26 to open under the pressure of the governor pump 12.

Although only one embodiment of the invention has been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. In a fluid system comprising fluid-responsive actuating servo means adapted to regulate the pitch of aircraft propeller blades, a governor pump, a transfer valve controlling fluid from the governor pump for actuating the servo means and having a bleeder hole, a feathering pump, and means including a reversible electric motor operating in one direction to start the aircraft engine and in the other direction to drive said feathering pump, the combination of a second valve associated with the feathering pump including a housing having a bore closed at one end and communicating from the other end with the feathering pump outlet, a first side port intersecting said bore next to said other end and communicating with the bleeder hole when the feathering pump is inactive, and a second side port communicating with the inlet side of the feathering pump and intersecting said bore at a position between said first port and the closed end of said bore, a stop in said bore between said first port and said other end, a thimble-like plunger axially slidably fitting said bore, a pin fixed to said closed end in said bore and extending axially into the open end of said plunger, and a compression spring around said pin between the closed ends of said housing and said plunger and operating during the inactive condition of the feathering pump to cause the closed end of said plunger to engage said stop and to close said other end, said plunger having first and second side ducts communicating with each other through the plunger and located during said condition in register with said first and second ports, respectively, said plunger under the active condition of the feathering pump being responsive to the feathering pump fluid pressure against the action of said spring to open said other end to said first port, to close said second duct relative to said second port and to open the first port through said transfer valve to said servo means whereupon the flow from the bleeder hole is interrupted.

2. In a fluid system comprising fluid-responsive means adapted to regulate the pitch of aircraft propeller blades, a governor pump, a transfer valve controlling fluid from the governor pump for actuating the responsive means and having a bleeder hole, a feathering pump, and means adapted to drive said feathering pump, the combination of a second valve associated with the feathering pump, conduit means connecting the second valve between the feathering pump outlet and the bleeder hole and through a feathering pump by-pass conduit to the inlet side of the feathering pump, said second valve cooperating with said conduit means and including means operative when the feathering pump is inactive to pass fluid from the bleeder hole through said by-pass conduit to the inlet side of the feathering pump, said last-named means being responsive to operation of the feathering pump to close said by-pass conduit, to cause the flow of fluid from the feathering pump outlet through the transfer valve to said control means, and to interrupt flow from the bleeder hole.

3. The combination of a valve housing having a through bore, a plug closing one end of and supporting a spring guide pin extending into the bore, a stop pin of small diameter compared to the diameter of the bore fixed to the housing and extending across the bore adjacent to the other end of the bore, said housing forming a first side port of relatively large diameter intersecting said bore next to said other end, and a second side port of smaller diameter intersecting said bore at a position between said first port and said plug, a thimble-like valve plunger axially slidably fitting said bore with its closed end next to said stop pin and receiving said spring guide pin through the open end of the plunger, and a compression spring around said spring guide pin extending from said plug and into said plunger to the closed end of the latter and biasing the plunger to position against said stop pin closing said other end of the bore, said plunger having first and second side ducts communicating with each other through the plunger and located in said position of the plunger in register with said first and second ports, respectively, to provide for a given flow, said plunger being adapted when in another position to open said other end to provide for greater flow to said first port and to stop said given flow by closing said second duct relative to said second port.

4. In a fluid system comprising fluid responsive means, a first pump, a first valve controlling fluid from the first pump for actuating the responsive means and having a bleeder hole and a first and second port, said second port connected to said first pump outlet, a second pump, and means for operating said second pump, the combination of a second valve associated with said second pump including a housing having a bore closed at one end and communicating from the other end with the second pump outlet, a first side port intersecting said bore next to said other end and communicating with the bleeder hole, and a second side port communicating with the inlet side of the second pump and intersecting said bore at a position between said first port and the closed end of said bore, a stop in said bore between said first port and said other end, a thimble-like plunger axially slidably fitting said bore, and a spring operating during the inactive condition of the second pump to cause the closed end of said plunger to engage said stop and to close said other end, said plunger having first and second side ducts communicating with each other through said plunger and located during said condition in register with said first and second ports, respectively, said plunger under the active condition of the second pump being responsive to the fluid pressure of the second pump against the action of said spring to open said other end to said first port, to close said second duct relative to said second port, and to open the first port through the first valve to said responsive means whereupon the flow from the bleeder hole is reversed.

5. In a fluid system comprising fluid responsive means, a first pump, a first valve controlling fluid from the first pump for actuating the responsive means and having bleeder means and a first port and a second port, said second port connected to said first pump outlet, and a second pump, the combination of a second valve associated with said second pump including a housing having a bore communicating with the second pump outlet, a first side port intersecting said bore and communicating with the bleeder means, and a second side port communicating with the inlet side of the second pump and intersecting said bore, and means including a hollow plunger axially slidably fitting said bore and having a closed end and operating during the inactive condition of the second pump to cause said closed end to close said communication of said bore with the second pump outlet, said plunger having first and second side ducts communicating with each other through the plunger and located during said condition in register with said first and second ports, respectively, said plunger under the active condition of the second pump being responsive to the fluid pressure of the second pump to establish said communication of said bore with the second pump outlet, to close said second duct relative to said second port, and to open the first port through the first valve to said responsive means whereupon the flow from the bleeder means is reversed.

6. In a fluid system comprising a plurality of means associated with each other at a given location and including fluid responsive means, first pump means adapted to supply actuating fluid to the responsive means, valve means controlling a first flow of fluid from the first pump means to the responsive means, and by-pass means for said first pump means providing for a second flow of fluid from said first pump means, said system also comprising means including second pump means at a location remotely disposed from said first location, and conduit means connecting said first plurality of means to said second pump means, the combination of second valve means associated with said second pump means including means operative when said second pump means is inactive to cause circulation of said second flow through said conduit means to the second location but by-passing the second pump means, and responsive to operation of the second pump to reverse the circulation of the fluid through the conduit means and to actuate the responsive means.

7. In a fluid system comprising a plurality of means associated with each other at a given location and including fluid responsive means, first pump means adapted to supply actuating fluid to the responsive means, valve means controlling a first flow of fluid from the first pump means to the responsive means, and by-pass means for said first pump means providing for a second flow of fluid from said first pump means, said system also comprising means including second pump means at a location remotely disposed from said first location, and conduit means connecting said first plurality of means to said second pump means, the combination of second valve means associated with said second pump means comprising by-pass means and including means operative when said second pump means is inactive to cause circulation of said second flow through said conduit means to the second location but by-passing the second pump means through said by-pass means, and responsive to operation of the second pump to cut off said by-pass means and to reverse the circulation of the fluid through the conduit means and to actuate the responsive means.

8. For use with a fluid operated mechanism; the combination comprising a first valve including a check valve and a housing therefor, said housing having fluid supply passage means and fluid by-pass passage means controlled by said check valve, a first source of fluid pressure connected to the supply passage means of said housing, a source of lesser fluid pressure, a transfer valve for connecting said fluid operated mechanism selectively to the first source of fluid pressure through said supply passage means of said housing or to the source of lesser fluid pressure, said transfer valve including means operative when said source of lesser fluid pressure is active and said first source of fluid pressure is inactive to permit a flow of fluid to the by-pass passage means of said housing, said check valve being responsive to said first source of fluid pressure and operative when the source of lesser fluid pressure is active and said first source of fluid pressure is inactive to permit a flow of fluid through said by-pass passage means to by-pass the first source of fluid pressure, and the check valve within said housing being operative when said first source of fluid pressure is active to close said by-pass passage means and open said supply passage means to cut off said by-pass and permit a flow of fluid from said first source of fluid pressure through said supply passage means and transfer valve to the fluid operated mechanism.

RAYMOND T. ZWACK.

REFERENCES CITED

The following references are of record in the file of this patent:

UNITED STATES PATENTS

| Number | Name | Date |
| --- | --- | --- |
| 2,137,402 | Hofferer | Nov. 22, 1938 |
| 2,275,321 | Scates | Mar. 3, 1942 |
| 2,280,713 | Martin et al. | Apr. 21, 1942 |
| 2,394,343 | Vorech | Feb. 5, 1946 |
| 2,398,713 | Martin | Apr. 16, 1946 |
| 2,402,065 | Martin | June 11, 1946 |
| 2,413,439 | Drake | Dec. 31, 1946 |

FOREIGN PATENTS

| Number | Country | Date |
| --- | --- | --- |
| 506,134 | France | May 22, 1920 |